United States Patent
Ballard et al.

(10) Patent No.: US 12,222,882 B2
(45) Date of Patent: Feb. 11, 2025

(54) SYSTEMS AND METHODS FOR SMART NETWORK INTERFACE CARD-INITIATED SERVER MANAGEMENT

(71) Applicant: Dell Products L.P., Round Rock, TX (US)

(72) Inventors: Lee E. Ballard, Georgetown, TX (US); Robert T. Stevens, Austin, TX (US); Hendrich M. Hernandez, Round Rock, TX (US); Gaurav Chawla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/244,338

(22) Filed: Apr. 29, 2021

(65) Prior Publication Data
US 2022/0350765 A1    Nov. 3, 2022

(51) Int. Cl.
*G06F 13/38*    (2006.01)
*G06F 13/40*    (2006.01)
*H04L 9/08*     (2006.01)
*H04L 9/32*     (2006.01)

(52) U.S. Cl.
CPC ........ *G06F 13/382* (2013.01); *G06F 13/4063* (2013.01); *H04L 9/085* (2013.01); *H04L 9/3213* (2013.01); *G06F 2213/3808* (2013.01)

(58) Field of Classification Search
None
See application file for complete search history.

(56) References Cited

U.S. PATENT DOCUMENTS

| 9,413,783 | B1 * | 8/2016 | Keogh | H04L 63/1458 |
| 9,578,034 | B2 * | 2/2017 | Potlapally | G06F 21/82 |
| 10,242,176 | B1 * | 3/2019 | Sathyanarayana | G06F 13/36 |
| 11,050,570 | B1 * | 6/2021 | Totah | H04L 9/3215 |
| 11,509,505 | B2 * | 11/2022 | Li | G06F 13/385 |
| 2009/0307474 | A1 * | 12/2009 | Johnston | H04W 12/0431 713/168 |

(Continued)

FOREIGN PATENT DOCUMENTS

| CN | 106911657 A | * | 6/2017 | ............ G06F 21/34 |
| CN | 108768730 A | * | 11/2018 | ............ G06F 11/221 |

(Continued)

*Primary Examiner* — Oleg Korsak
*Assistant Examiner* — Shadi H Kobrosli
(74) *Attorney, Agent, or Firm* — Jackson Walker L.L.P.

(57) ABSTRACT

An information handling system may include a processor, a management controller communicatively coupled to the processor and configured for out-of-band management of the information handling system, and a smart network interface card communicatively coupled to the processor and the management controller, and configured to obtain a secret for authenticating the smart network interface card to the management controller, request an access token reference from the management controller, the request including the secret and an identifier of the smart network interface card in order to authenticate the smart network interface card to the management controller, in response to the request for the access token reference, receive the access token reference, and communicate a management task request to the management controller using the access token reference.

12 Claims, 2 Drawing Sheets

(56) References Cited

U.S. PATENT DOCUMENTS

| | | | | |
|---|---|---|---|---|
| 2018/0041344 | A1* | 2/2018 | Rahardjo | G06F 21/57 |
| 2018/0288082 | A1* | 10/2018 | Pope | H04L 63/1425 |
| 2019/0305973 | A1* | 10/2019 | Dewan | H04L 9/14 |
| 2020/0220713 | A1* | 7/2020 | Li | H04L 9/14 |
| 2021/0157760 | A1* | 5/2021 | Kaler | H04L 9/0822 |
| 2021/0226935 | A1* | 7/2021 | Mundt | H04L 9/3234 |
| 2022/0066895 | A1* | 3/2022 | Itkin | G06F 21/606 |
| 2022/0103543 | A1* | 3/2022 | Saha | H04L 61/2557 |
| 2022/0164451 | A1* | 5/2022 | Bagwell | H04L 63/0428 |
| 2022/0231968 | A1* | 7/2022 | Rajagopal | H04L 47/24 |
| 2022/0263916 | A1* | 8/2022 | Shah | G06F 13/382 |

FOREIGN PATENT DOCUMENTS

| | | | | | |
|---|---|---|---|---|---|
| EP | | 2977889 | A1 * | 1/2016 | G06F 11/2284 |
| EP | | 3462353 | A1 * | 4/2019 | G06F 21/51 |
| WO | WO-2017113879 | A1 * | 7/2017 | | G06F 13/10 |

* cited by examiner

SYSTEMS AND METHODS FOR SMART NETWORK INTERFACE CARD-INITIATED SERVER MANAGEMENT

TECHNICAL FIELD

The present disclosure relates in general to information handling systems, and more particularly to methods and systems for deploying an operating system to a smart network interface card and lifecycle management of the network interface card.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A smart network interface card or "smartNIC" may offer capabilities not found in traditional network interface cards (NICs). In addition to the stateful and custom offloads a smartNIC may provide, it may have an independent management domain with a separate operating system, independent credentials, and independent remote access.

When a smartNIC is used in a "bare metal" infrastructure mode, the smartNIC may need the ability to perform power operations and other system management operations via a management controller (e.g., Integrated Dell Remote Access Controller) independent of a higher-level console of the information handling system (e.g., to react to heartbeat failures of a virtual machine when a virtual machine manager is unavailable). For the smartNIC to be able to perform such functionality, the management controller must authorize the smartNIC, but storing a username and password for the management controller on the smartNIC presents security concerns.

SUMMARY

In accordance with the teachings of the present disclosure, the disadvantages and problems associated with existing approaches to server management using a smartNIC may be reduced or eliminated.

In accordance with embodiments of the present disclosure, an information handling system may include a processor, a management controller communicatively coupled to the processor and configured for out-of-band management of the information handling system, and a smart network interface card communicatively coupled to the processor and the management controller, and configured to obtain a secret for authenticating the smart network interface card to the management controller, request an access token reference from the management controller, the request including the secret and an identifier of the smart network interface card in order to authenticate the smart network interface card to the management controller, in response to the request for the access token reference, receive the access token reference, and communicate a management task request to the management controller using the access token reference.

In accordance with these and embodiments of the present disclosure, a method may include, in an information handling system comprising a processor, a management controller communicatively coupled to the processor and configured for out-of-band management of the information handling system, and a smart network interface card communicatively coupled to the processor and the management controller: obtaining, by the smart network interface card, a secret for authenticating the smart network interface card to the management controller; requesting, by the smart network interface card, an access token reference from the management controller, the request including the secret and an identifier of the smart network interface card in order to authenticate the smart network interface card to the management controller; in response to the request for the access token reference, receiving, by the smart network interface card, the access token reference; and communicating, by the smart network interface card, a management task request to the management controller using the access token reference.

In accordance with these and embodiments of the present disclosure, an article of manufacture may include a non-transitory computer-readable medium and computer-executable instructions carried on the computer-readable medium, the instructions readable by a processor of a smart network interface card of an information handling system comprising a host processor communicatively coupled to the smart network interface card and a management controller communicatively coupled to the host processor and the smart network interface card and configured for out-of-band management of the information handling system, the instructions, when read and executed, for causing the processor to: obtain a secret for authenticating the smart network interface card to the management controller; request an access token reference from the management controller, the request including the secret and an identifier of the smart network interface card in order to authenticate the smart network interface card to the management controller; in response to the request for the access token reference, receive the access token reference; and communicate a management task request to the management controller using the access token reference.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
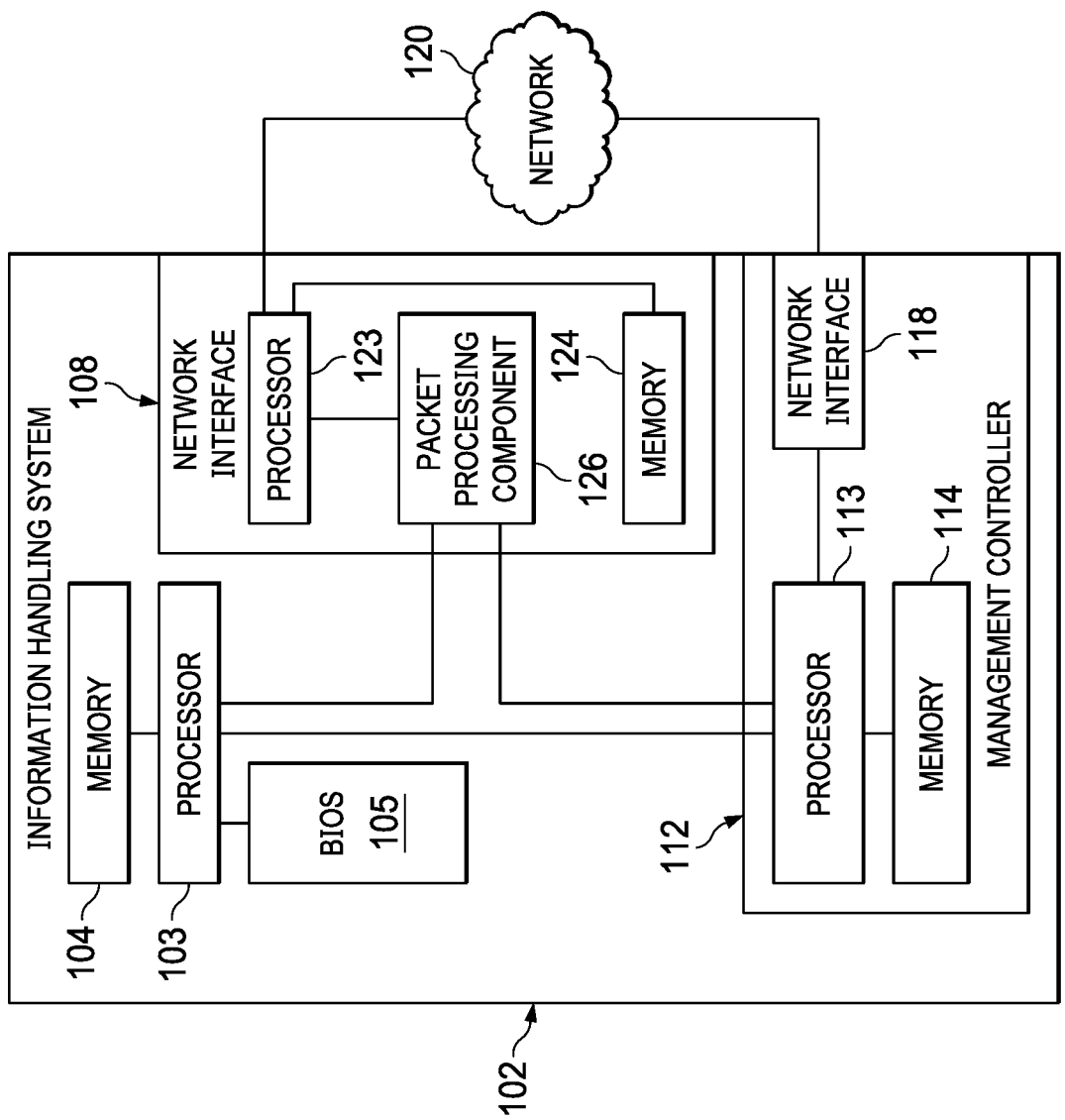
FIG. 1 illustrates a block diagram of an example information handling system, in accordance with embodiments of the present disclosure.
Figure 2:
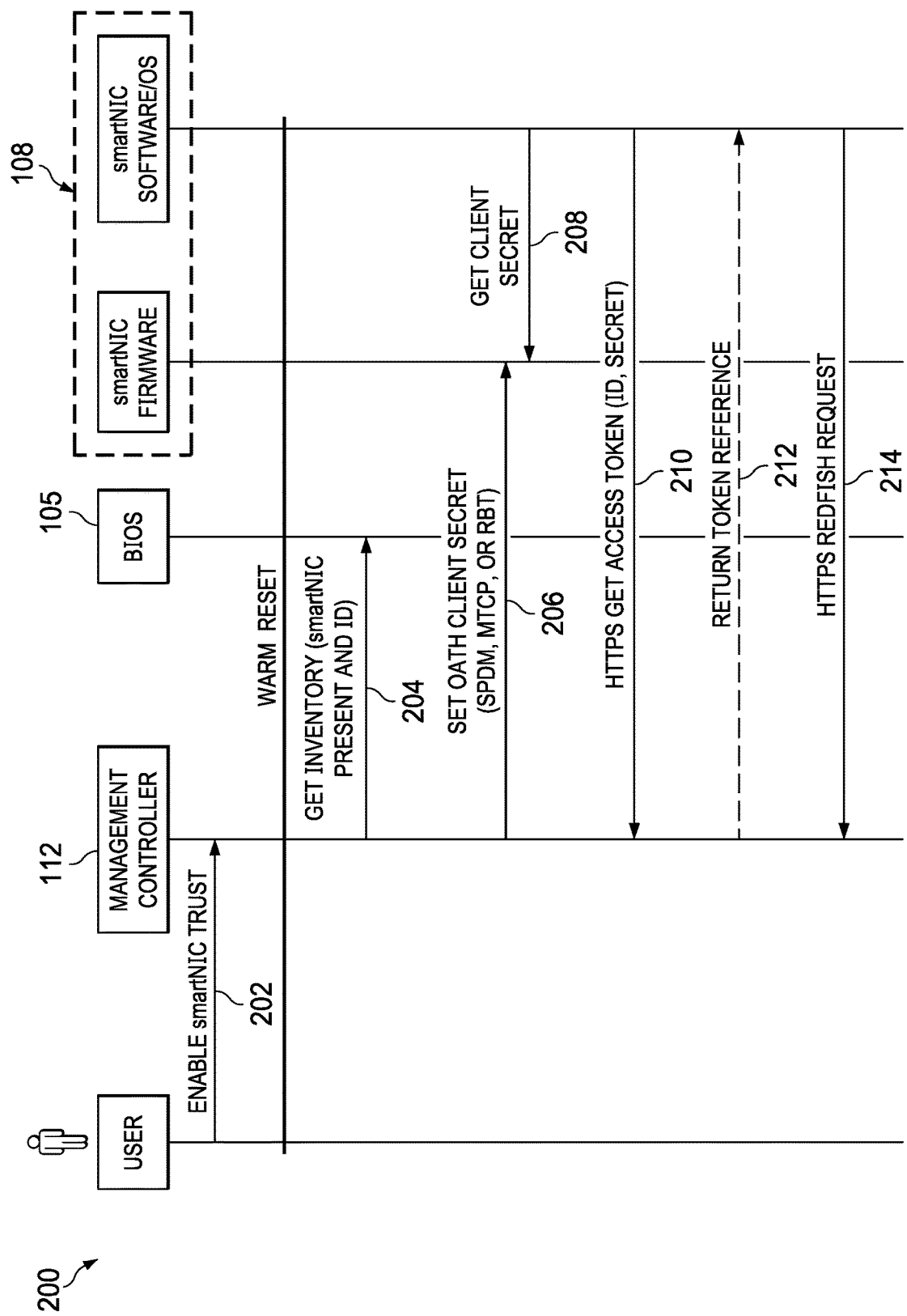
FIG. 2 illustrates a flow chart of an example method for smartNIC-initiated management of an information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output (BIOS) system 105 communicatively coupled to processor 103, a network interface 108 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Network interface 108 may comprise any suitable system, apparatus, or device operable to serve as an interface between information handling system 102 and one or more other information handling systems. Network interface 108 may enable information handling system 102 to communicate using any suitable transmission protocol and/or standard. In these and other embodiments, network interface 108 may comprise a network interface card, or "NIC." In particular, network interface 108 may comprise a smartNIC having a processor 123, memory 124, and packet processing component 126. A smartNIC may also be known as a Data Processing Unit (DPU), functional accelerator card (FAC), functional off-load coprocessor (FOCP), or distributed services card (DSC).

Processor 123 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored in memory 124 and/or another component of network interface 108.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to network interface 108 is turned off. Memory 124 may have stored thereon software and/or firmware which may be read and executed by processor 123 for carrying out the functionality of network interface 108.

Packet processing component 126 may be communicatively coupled to processor 123, memory 124, processor 103, and/or management controller 112 and may include any system, device, or apparatus configured to act as a switching interface between components of network interface 108 and components external to network interface 108. For example, packet processing component 126 may be communicatively coupled to management controller 112 via an Inter-Integrated Circuit (I2C) bus, Peripheral Component Interconnect Express (PCIe) bus, vendor-defined message (VDM) bus, or any other suitable bus or channel. Packet processing component 126 may be implemented with an application specific integrated circuit (ASIC), field-programmable gate array (FPGA), or any other suitable digital or analog circuitry.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from in-band network interface 108. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

Network interface 118 may comprise any suitable system, apparatus, or device operable to serve as an interface between management controller 112 and/or one or more other information handling systems. Network interface 118 may enable management controller 112 to communicate using any suitable transmission protocol and/or standard. In these and other embodiments, network interface 118 may comprise a network interface card, or "NIC."

In addition to processor 103, memory 104, BIOS 105, network interface 108, and management controller 112, information handling system 102 may include one or more other information handling resources.

Network 120 may comprise a network and/or fabric configured to couple information handling system 102 to one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data).

Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

In operation, when smartNIC trust is enabled by a user (e.g., an administrator via a management console communicatively coupled to management controller 112), management controller 112 may examine the inventory of information handling system 102 to determine if there is a known smartNIC (e.g., network interface 108) in a privileged slot (e.g., a Peripheral Component Interconnect (PCI) slot) of information handling system 102. If network interface 108 is determined to be a smartNIC disposed in a privileged slot, management controller 112 may communicate a randomly-generated secret to network interface 108 via a secure management channel, such as an Inter-Integrated Circuit (I2C) channel, a reduced media-independent interface-based transport (RBT) channel, or a Peripheral Component Interconnect Express (PCIe) channel, for example. In some embodiments, network interface 108 may support the Security Protocol and Data Model (SPDM) specification and/or support firmware measurement, such that both the firmware and hardware of network interface 108 may be validated prior to setting the secret. In some embodiments, rather than management controller 112 generating the secret and communicating it to network interface 108, network interface 108 may generate the secret and management controller 112 may retrieve the secret from network interface 108.

The secret and identity of network interface 108 may be used to authenticate network interface 108 to management controller 112, for example, for an OAuth client credentials grant (e.g., pursuant to Internet Engineering Task Force Request for Comments 6749) to give network interface 108 access tokens for needed functions of management controller 112. Because the access token references are references to tokens stored on management controller 112, the access token references may be revoked by management controller 112 if the user disables smartNIC trust.

In other embodiments, a similar approach may be used to establish trust between two host information handling systems that share a multi-host device. In such embodiments, a first host information handling system may use SPDM to write a secret to smartNIC firmware and a second host information handling system may use SPDM to retrieve the secret.

Among the advantages of the smartNIC-initiated management disclosed herein is that it uses a secure management channel for passing a temporary secret to validate a location of the smartNIC. Firmware and software of network interface 108 may be configured to relay the secret from one host (e.g., processor 113) to another host (e.g., processor 123). Authorization may be based on connections to management channels that support part replacement with reprovisioning of information handling system 102. Another further advantage is an automatic invalidation of secret and access grant when network interface 108 is removed or reset or information handling system 102 is reset. An additional advantage is that authentication may be based on SPDM and firmware measurement, such that smartNIC to management controller authorization is based on an approved authenticated card being located in an approved privileged slot running approved authentic firmware and software, thus leveraging secure physical connections (e.g., I2C, PCIe, RBT, etc.) to verify that the smartNIC is actually physically present in the same chassis as the management controller.

FIG. 2 illustrates a flow chart of an example method 200 for smartNIC-initiated management of an information handling system, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, a user (e.g., administrator) may communicate a command (e.g., via a management console) to management controller 112 to enable smartNIC trust on information handling system 102. At step 204, after a warm reset of information handling system 102, management controller 112 may retrieve inventory of information handling system 102 from BIOS 105 to determine if a smartNIC is present in a privileged slot, and if so, an identifier of such smartNIC.

If such a smartNIC is found (e.g., network interface 108), at step 206, management controller 112 may set a secret (e.g., an OAuth client secret) and communicate such secret to firmware of network interface 108 via a secure protocol or standard (e.g., SPDM, RBT, etc.).

At step 208, an operating system (OS) or other software of network interface 108 may retrieve the secret from firmware of network interface 108. At step 210, OS/other software of network interface 108 may request an access token from management controller 112, providing an identifier and the secret to management controller 112 as an authentication. In response, at step 212, management controller 112 may return an access token reference to OS/other software of network interface 108.

At step 214, network interface 108 may communicate management requests (e.g., Hypertext Transfer Protocol Secure or HTTPS Redfish requests) to management controller 112 for managing information handling system 102 using access token references.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a host processor;
   a baseboard management controller communicatively coupled to the host processor and configured for out-of-band management of the information handling system; and
   a smart network interface card communicatively coupled to the host processor and the baseboard management controller, and configured to:
      obtain a secret, randomly generated by the baseboard management controller, for authenticating the smart network interface card to the baseboard management controller;
      request an access token reference from the baseboard management controller, the request including the secret and an identifier of the smart network interface card in order to authenticate the smart network interface card to the baseboard management controller;
      in response to the request for the access token reference, receive the access token reference; and
      communicate a management task request to the baseboard management controller using the access token reference;
      wherein the secret is invalidated in response to removal of the smart network interface card.

2. The information handling system of claim 1, wherein the smart network interface card is configured to obtain the secret from the baseboard management controller via a secured communication channel.

3. The information handling system of claim 2, wherein the baseboard management controller is configured to:
   obtain an inventory of the information handling system; and
   generate the secret in response to a determination from the inventory that the smart network interface card is located in a privileged slot of the information handling system.

4. The information handling system of claim 3, wherein the baseboard management controller is configured to:
   generate the secret in response to a determination that the hardware and software of the smart network interface card are authenticated.

5. A method comprising, in an information handling system comprising a host processor, a baseboard management controller communicatively coupled to the host processor and configured for out-of-band management of the information handling system, and a smart network interface card communicatively coupled to the host processor and the baseboard management controller:
   obtaining, by the smart network interface card, a secret, randomly generated by the baseboard management controller, for authenticating the smart network interface card to the baseboard management controller;
   requesting, by the smart network interface card, an access token reference from the baseboard management controller, the request including the secret and an identifier of the smart network interface card in order to authenticate the smart network interface card to the baseboard management controller;
   in response to the request for the access token reference, receiving, by the smart network interface card, the access token reference; and
   communicating, by the smart network interface card, a management task request to the baseboard management controller using the access token reference;
   wherein the secret is invalidated in response to removal of the smart network interface card.

6. The method of claim 5, wherein method further comprises obtaining, by the smart network interface card, the secret from the baseboard management controller via a secured communication channel.

7. The method of claim 6, further comprising:
   obtaining, by the baseboard management controller, an inventory of the information handling system; and
   generating, by the baseboard management controller, the secret in response to a determination from the inventory that the smart network interface card is located in a privileged slot of the information handling system.

8. The method of claim 7, further comprising:
   generating, by the baseboard management controller, the secret in response to a determination that the hardware and software of the smart network interface card are authenticated.

9. An article of manufacture comprising:
   a non-transitory computer-readable medium; and
   computer-executable instructions carried on the computer-readable medium, the instructions readable by a processor of a smart network interface card of an information handling system comprising a host processor communicatively coupled to the smart network interface card and a baseboard management controller communicatively coupled to the host processor and the smart network interface card and configured for out-of-band management of the information handling system, the instructions, when read and executed, for causing the processor to:
      obtain a secret, randomly generated by the baseboard management controller, for authenticating the smart network interface card to the baseboard management controller;
      request an access token reference from the baseboard management controller, the request including the secret and an identifier of the smart network interface card in order to authenticate the smart network interface card to the baseboard management controller;

in response to the request for the access token reference, receive the access token reference; and communicate a management task request to the baseboard management controller using the access token reference;

wherein the secret is invalidated in response to removal of the smart network interface card.

10. The article of claim 9, wherein the instructions are for further causing the processor to obtain the secret from the baseboard management controller via a secured communication channel.

11. The article of claim 10, wherein the baseboard management controller is configured to:

obtain an inventory of the information handling system; and generate the secret in response to a determination from the inventory that the smart network interface card is located in a privileged slot of the information handling system.

12. The article of claim 11, wherein the baseboard management controller is configured to:

generate the secret in response to a determination that the hardware and software of the smart network interface card are authenticated.

* * * * *